Oct. 7, 1924. Re. 15,927

K. O. SCHAUMAN

CABLE BUMPER

Original Filed May 11, 1922 2 Sheets-Sheet 1

INVENTOR

Karl Anton Schauman

BY

Louis Harris Marrin & Edmonds

ATTORNEY

Oct. 7, 1924.

Re. 15,927

K. O. SCHAUMAN

CABLE BUMPER

Original Filed May 11, 1922 2 Sheets-Sheet 2

INVENTOR
Karl Oden Schauman

BY
Connor Davis Warren & Edmonds
ATTORNEY

Reissued Oct. 7, 1924.

Re. 15,927

UNITED STATES PATENT OFFICE.

KARL OSTEN SCHAUMAN, OF NEW YORK, N. Y., ASSIGNOR TO WILLIAM H. AVERY, OF SAN FRANCISCO, CALIFORNIA.

CABLE BUMPER.

Original No. 1,450,262, dated April 3, 1923, Serial No. 560,083, filed May 11, 1922. Application for reissue filed August 23, 1924. Serial No. 733,848.

*To all whom it may concern:*

Be it known that I, KARL OSTEN SCHAUMAN, a subject of the King of Sweden, residing at New York, N. Y., have invented certain new and useful Improvements in Cable Bumpers; and I do hereby declare the following to be a full, clear, and exact description of the invention, such as will enable others skilled in the art to which it appertains to make and use the same.

My invention has for its object a flexible member and associated parts for mounting on the front or rear portions of an automobile, or both, and which is adapted to first engage an object with which the automobile would otherwise impact, and when functioning in this way to establish a resistance to the automobile movement which will retard or entirely arrest said movement; or if the automobile be standing to prevent damage which would otherwise occur from the impact of objects moving against it, as for example other automobiles approaching or backing into the car when standing.

A further object is to provide in such a device a flexible contacting member readily adapting itself to the configuration of the surface of any object with which it contacts, although, through its connections with other parts of the bumper construction, the device exercises the proper retarding effect upon the vehicle.

Another object is a bumper as set forth, wherein a plurality of cable members parallel with each other, form a composite primary member thereby providing a large contact surface.

A further object is a bumper of the character described wherein electric connections are provided for the purpose of giving a danger signal or setting the brakes of the machine, or both.

A further object is such a bumper consisting of a plurality of cables of the character described, wherein the cable member, when distorted in any direction from its normal straight line position, will offer resistance to further movement, and will establish electric contacts for energizing other devices as brake setting means, danger signals, etc.

A further object is such a bumper consisting primarily of three parts substantially in the same plane, the outermost part being formed of a cable or cables; the innermost member being relatively rigid and with spring ends and between these two members a third member flexibly mounted to establish electric contacts with the relatively rigid member whenever the primary member is distorted.

Further objects will appear from the drawings and specifications which follow.

Referring to the drawings.

Throughout the figures similar numerals refer to identical parts.

Figure 1:
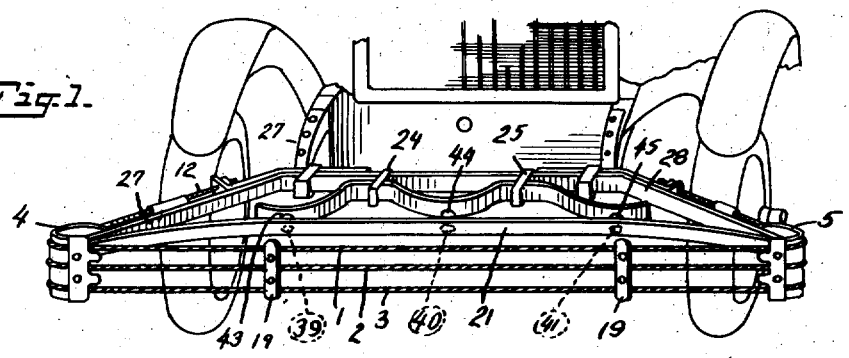
Fig. 1 is a perspective view of my cable bumper applied to the front of the automobile.
Figure 2:
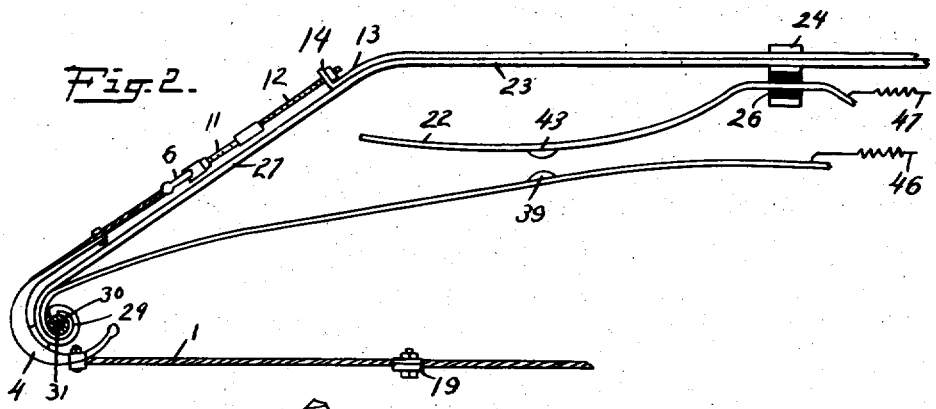
Fig. 2 is an enlarged plan view of one end of my bumper.
Figure 3:
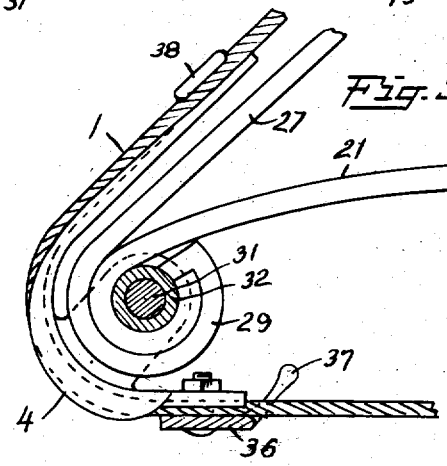
Fig. 3 is an enlarged view of one of the hinge joints thereof.
Figure 4:
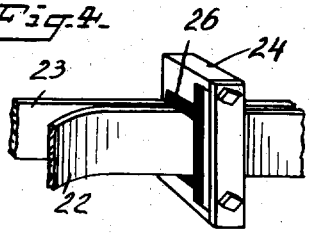
Fig. 4 is a perspective view of the flexible and relatively rigid members and the block connecting the two parts and the manner in which they are insulated from each other.
Figure 5:
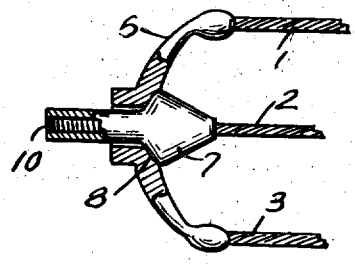
Fig. 5 is a detail of one of the cable clevises in section.
Figure 6:
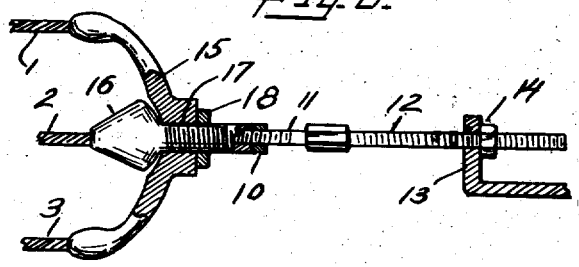
Fig. 6 shows the cable clevis for the opposite end of the cable member and adjusting means by which the tension on the plurality of cables is equalized.
Figure 10:
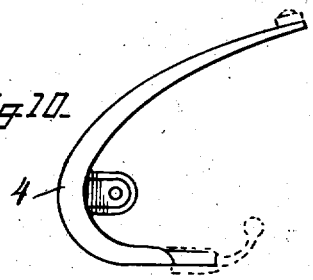
Fig. 10 is a plan view of Fig. 9.
Figure 7:
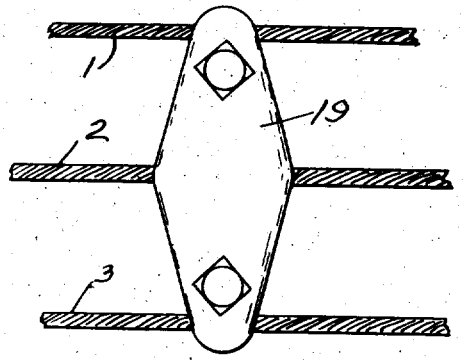
Fig. 7 is an enlarged front view of a portion of the three cables which form the cable member of Fig. 1, showing the spacing bar which maintains the cables in the proper spaced relation.
Figure 9:
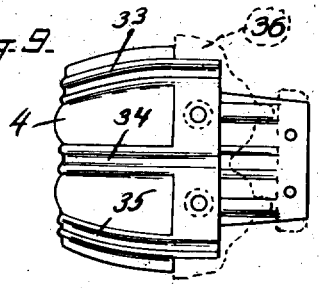
Fig. 9 is a front view of one of the cable shoes.
Figure 8:
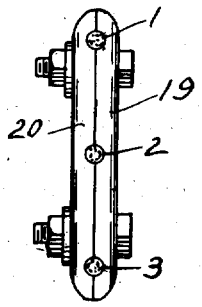
Fig. 8 is an end view of Fig. 7 and at right angles thereto.

The primary flexible member in the construction here illustrated consists of the flexible cables, 1, 2, 3. These are reeved about the shoes 4, 5, on each end and are fixed in any conventional manner in the two ends of the U piece 6 and center head 7 which latter I prefer to seat in the U piece 6 on a substantially spherical joint 8. The rear portion of the head 7 is formed with a spindle 9 threaded at 10 for connection with draw bolt 11 which is threaded at 12 and supported from the bracket 13; adjustment of the tension of the cables being effected on this side by the nut 14 on the said threads 12, or by the thread at 10. The opposite end of the cables is provided with the U piece 15 in which the head 16 is adjustable on the threads 17 and may be locked in any adjusted position by the nut 18. A connecting rod 11, threads 10 and 12, nut 14 and bracket 13 are provided. The tension in the cables, 1 and 3, is equalized by the U piece 6 pivoting on the socket 8, whereas the tension of the central cable 2 is equalized with that of the cables 1 and 3 by the adjustment of the threaded member 17 in the U piece 15. At 19 and 20 is shown a two-piece spacing member clamped about the cables 1, 2, 3, to hold them in spaced relation at suitable intervals of their length. At 21 is shown a spring member between the cable and the rear spring leaf 22. This spring leaf 22 is mounted with the rigid frame piece 23 by blocks 24, 25, which are provided with an insulation lining 26 between the members 22 and 23. The relatively rigid member 23 has its ends bent around as shown at 27, 28, forming spring arms and forming support for the spring member 21 through the flexible hinge ends. The ends 27 are preferably coiled on the outside, as at 29, and the ends of the member 21 coiled on the inside, as at 30. A central pivot 31 which may have a bushing 32 thereon, supports the shoe member 4 and is attached by suitable brackets preferably formed integral therewith.

This shoe member is provided on its outer surface with cable grooves 33, 34, 35, for the cables 1, 2, 3, respectively, and when the cables are properly positioned within these grooves the keeper plate 36 is bolted over the cables to retain them in the grooves. This plate is preferably turned inward between the cables and provided with ball ends at 37 to prevent any possibility of the rigid portions of the shoe engaging against an object which may press the cables inward. A second keeper plate 38 is provided at the other end of the shoe so that when the cables are assembled about the shoe under the plates 36, 38, they are held at all times in proper spaced relation therewith. At 39, 40, 41 are shown electric contacts on the member 21 and at 43, 44, 45 cooperating contacts on the member 22. Circuit connections are then established as shown diagrammatically at 46 to the member 21, and at 47 to the member 22. The operation is as follows:

If the automobile move against any object, or if the automobile be stationary and any object move against the bumper cable member, or if a body falls upon the cable member, the tension in the said member will draw together the shoes 4, 5 and their hinged ends, forcing the member 21 inwards towards the member 22 and causing contact of some or all of the cooperating contacts 39, 43, or 40, 44, or 41, 45 thus establishing the electric circuit between the connections 46, 47.

The energization of this circuit may be employed for setting the brakes of the automobile, or giving a danger signal, or both, but my present invention is directed to the cable bumper structure above described, employed with or without the electric circuit and attention is herein directed to my Patent No. 1,398,399 of November 29, 1921, reissued as No. 15,467 wherein are more fully set forth the use and action of the said electric circuit.

I claim:

1. A cable bumper comprising a flexible non-extensible cable member, supports for each end of said member, spring means tending to keep the ends of the cable member separated, a spring leaf intermediate the spring means and the cable member and substantially in the same plane therewith, and means insulating said leaf from said member and said supports.

2. A cable bumper comprising a flexible non-extensible cable member, supports for each end of said member, spring means tending to keep the ends of the cable member separated, means for attaching said spring means to a vehicle, a spring leaf intermediate the spring means and the cable member and substantially in the same plane therewith, and means insulating said leaf from said member and said supports.

3. A cable bumper comprising a flexible non-extensible cable member, supports for each end of said member, spring means tending to keep the ends of the cable member separated, means for attaching said spring means to a vehicle, means for adjusting the tension of the spring means, a spring leaf intermediate the spring means and the cable member and substantially in the same plane therewith, and means insulating said leaf from said member and said supports.

4. A cable bumper comprising a flexible non-extensible cable member, supports for each end of said member, spring means tending to keep the ends of the cable member separated, a spring leaf intermediate the spring means and the cable member and substantially in the same plane therewith, and an electric contact fixed in spaced relation with respect to, and normally insulated from, portions of said spring leaf, and adapted to close an electric circuit when the spring means is distorted.

5. A cable bumper comprising a flexible non-extensible cable member, supports for each end of said member, spring means tending to keep the ends of the cable member separated, means for attaching said spring means to a vehicle, a spring leaf intermediate the spring means and the cable member and substantially in the same plane therewith, and an electric contact fixed in spaced relation with respect to, and normally insulated from, portions of said spring leaf, and adapted to close an electric circuit when the spring means is distorted.

6. A cable bumper comprising a flexible non-extensible cable member, supports for each end of said member, spring means tending to keep the ends of the cable member separated, means for attaching said spring means to a vehicle, means for adjusting the tension of the spring means, a spring leaf intermediate the spring means and the cable member and substantially in the same plane therewith, and an electric contact fixed in spaced relation with respect to, and normally insulated from, portions of said spring leaf, and adapted to close an electric circuit when the spring means is distorted.

7. Parts as set forth in claim 4 wherein there are a plurality of said contacts laterally spaced apart and a plurality of portions of said leaf adapted to contact with one or more of said contacts.

8. Parts as set forth in claim 5 wherein there are a plurality of said contacts laterally spaced apart and a plurality of portions of said leaf adapted to contact with one or more of said contacts.

9. Parts as set forth in claim 6 wherein there are a plurality of said contacts laterally spaced apart and a plurality of portions of said leaf adapted to contact with one or more of said contacts.

10. A cable bumper as set forth in claim 1 wherein there are a plurality of cables spaced apart vertically and substantially parallel to form said cable member and means constructed and adapted to adjust the effective length of said cables.

11. A cable bumper as set forth in claim 2 wherein there are a plurality of cables spaced apart vertically and substantially parallel to form said cable member and means constructed and adapted to adjust the effective length of said cables.

12. A cable bumper as set forth in claim 3 wherein there are a plurality of cables spaced apart vertically and substantially parallel to form said cable member and means constructed and adapted to adjust the effective length of said cables.

13. A cable bumper as set forth in claim 4 wherein there are a plurality of cables spaced apart vertically and substantially parallel to form said cable member and means constructed and adapted to adjust the effective length of said cables.

14. A cable bumper as set forth in claim 5 wherein there are a plurality of cables spaced apart vertically and substantially parallel to form said cable member and means constructed and adapted to adjust the effective length of said cables.

15. A cable bumper as set forth in claim 6 wherein there are a plurality of cables spaced apart vertically and substantially parallel to form said cable member and means constructed and adapted to adjust the effective length of said cables.

16. Parts as set forth in claim 4 wherein there are a plurality of said contacts laterally spaced apart and a plurality of portions of said leaf adapted to contact with one or more of said contacts, said cable member comprising a plurality of cables spaced apart vertically and substantially parallel and means constructed and adapted to adjust the effective length of said cables.

17. Parts as set forth in claim 5 wherein there are a plurality of said contacts laterally spaced apart and a plurality of portions of said leaf adapted to contact with one or more of said contacts, said cable member comprising a plurality of cables spaced apart vertically and substantially parallel and means constructed and adapted to adjust the effective length of said cables.

18. Parts as set forth in claim 6 wherein there are a plurality of said contacts laterally spaced apart and a plurality of portions of said leaf adapted to contact with one or more of said contacts, said cable member comprising a plurality of cables spaced apart vertically and substantially parallel and means constructed and adapted to adjust the effective length of said cables.

In testimony whereof I affix my signature.

KARL OSTEN SCHAUMAN.